(12) United States Patent
Ruhland et al.

(10) Patent No.: US 11,787,324 B2
(45) Date of Patent: Oct. 17, 2023

(54) TROLLEY FOR ROLLS OF MATERIAL

(71) Applicant: BHS Intralogistics GmbH, Mintraching (DE)

(72) Inventors: Martin Ruhland, Regensburg-Sallern-Gallingkofen (DE); Karl Ruhland, Pfreimd (DE)

(73) Assignee: BHS Intralogistics GmbH, Mintraching (DE)

(*) Notice: Subject to any disclaimer, the term of this patent is extended or adjusted under 35 U.S.C. 154(b) by 416 days.

(21) Appl. No.: 17/044,031

(22) PCT Filed: Mar. 8, 2019

(86) PCT No.: PCT/EP2019/055899
§ 371 (c)(1),
(2) Date: Sep. 30, 2020

(87) PCT Pub. No.: WO2019/197089
PCT Pub. Date: Oct. 17, 2019

(65) Prior Publication Data
US 2021/0101516 A1    Apr. 8, 2021

(30) Foreign Application Priority Data

Apr. 9, 2018   (DE) ............... 10 2018 205 290.5

(51) Int. Cl.
*B60P 3/035*   (2006.01)
*B60L 50/60*   (2019.01)
(Continued)

(52) U.S. Cl.
CPC ............. *B60P 3/035* (2013.01); *B60L 50/60* (2019.02); *G05D 1/021* (2013.01); *G05D 1/0088* (2013.01); *G05D 2201/0216* (2013.01)

(58) Field of Classification Search
CPC ........ B60P 3/035; B60L 50/60; G05D 1/021; G05D 1/0088; G05D 2201/0216; Y02T 10/70; B65H 19/30; B65G 1/04
See application file for complete search history.

(56) References Cited

U.S. PATENT DOCUMENTS 4,948,060 A * 8/1990 Kurz .................... B65H 19/105
                                                         242/559.2
5,451,133 A    9/1995 Salsburg et al.
(Continued)

FOREIGN PATENT DOCUMENTS

CN    205527619 U  *  8/2016
CN    106314594 A  *  1/2017 ............... B60K 1/02
(Continued)

*Primary Examiner* — Michael J Zanelli
(74) *Attorney, Agent, or Firm* — McGlew and Tuttle, P.C.

(57) ABSTRACT

The invention relates to a transport trolley for transporting material rolls. The transport trolley includes a frame, at least three running units for running on a ground, wherein the running units are connected to the frame, at least one movement drive for driving at least one of the running units, wherein the at least one movement drive is connected to the frame, a material roll receiving device for receiving a material roll to be transported, wherein the material roll receiving device is supported by the frame, and a communications device with a receiver unit for receiving external information items being connected to the frame. The communications device is in signal connection with the at least one movement drive for actuating the latter.

25 Claims, 11 Drawing Sheets

(51) Int. Cl.
*G05D 1/02* (2020.01)
*G05D 1/00* (2006.01)

(56) References Cited

U.S. PATENT DOCUMENTS

| | | | | |
|---|---|---|---|---|
| 5,934,604 | A * | 8/1999 | Klimek | B65H 19/126 |
| | | | | 242/558 |
| 6,264,417 | B1 | 7/2001 | Salsburg | |
| 2002/0007235 | A1* | 1/2002 | Hwang | B60L 3/04 |
| | | | | 701/70 |
| 2006/0053068 | A1 | 3/2006 | Gretsch et al. | |
| 2017/0334224 | A1 | 11/2017 | Torigoe | |

FOREIGN PATENT DOCUMENTS

| | | | | |
|---|---|---|---|---|
| DE | 1940426 | A1 | | 3/1970 |
| DE | 3731488 | A1 | | 3/1988 |
| DE | 4219518 | A1 * | 2/1993 | ........... B65H 19/102 |
| DE | 102016218106 | A1 | | 3/2018 |
| EP | 0950625 | A2 * | 4/1999 | |
| GB | 2195322 | A | | 4/1988 |
| JP | S613211 | A | | 1/1986 |
| JP | 2002326744 | A | | 11/2002 |
| JP | 2004320923 | A | | 11/2004 |
| JP | 2006501552 | A | | 1/2006 |
| JP | 2008247513 | A | | 10/2008 |
| JP | 2010159099 | A | | 7/2010 |
| JP | 2017209787 | A | | 11/2017 |

* cited by examiner

TROLLEY FOR ROLLS OF MATERIAL

CROSS-REFERENCES TO RELATED APPLICATIONS

This application claims the priority of German Patent Application, Serial No. 10 2018 205 290.5, filed Apr. 9, 2018, the content of which is incorporated herein by reference in its entirety as if fully set forth herein.

FIELD OF THE INVENTION

The invention relates to a transport trolley for transporting material rolls, such as paper rolls, cardboard rolls or the like, in particular in a corrugated board plant. Furthermore, the invention is directed to an arrangement consisting of a transport trolley and a material roll to be transported. Furthermore, the invention is directed to a corrugated board plant with at least one transport trolley of this type.

BACKGROUND OF THE INVENTION

Carriages which are guided on straight rails for transporting material rolls in a corrugated board plant are known from the prior art. Said system is extremely inflexible and complicated.

Furthermore, the prior art discloses self-propelled transport trolleys which equip plants and/or machines during use. Said transport trolleys are of very complicated construction and are therefore very expensive. Moreover, it is disadvantageous that, in the case of jobs which are to be processed at the same time, such as in the case of a width change of a corrugated board web, a bottleneck is generally produced on account of the serial processing of the job. Only a few transport trolleys can be used, usually at most from 2 to 5, since they would otherwise impede one another, which is the case, above all, in two-way traffic. Moreover, the use of a plurality of transport trolleys of this type would be associated with a not inconsiderable cost outlay.

DE 10 2016 218 106 A1 discloses an apparatus for removing a material roll from a roll carrier of a machine which processes material web, in particular a web-fed printing press. A material roll to be dispensed can be received by a removal device and can be moved into a storage position. The removal device has a transfer device which can be moved along a defined distance and has a substructure, for example in the manner of a trolley. A drive motor is arranged on the transfer device for the movement capability. Said apparatus is extremely inflexible and expensive.

DE 37 31 488 A1 discloses a corrugated board machine with a roll stand. A conveying apparatus serves for movement to and fro between a storage space and the roll stand, which conveying apparatus has a guide groove which is provided in the floor and a trolley which is provided so as to run freely along the guide groove. Each end of a tension regulation chain which can be driven is connected to the trolley.

SUMMARY OF THE INVENTION

The invention is based on an object of overcoming the disadvantages of the prior art. In particular, a transport trolley is to be provided which is extremely flexible and simple, and inexpensive. A corresponding arrangement consisting of a transport trolley and a material roll to be transported is to be provided, moreover. Furthermore, a corresponding corrugated board system with at least one transport trolley of this type is to be supplied.

According to the invention, said object is achieved by a transport trolley for transporting material rolls, in particular in a corrugated board plant, comprising a frame, at least three running units for running on a ground, wherein the running units are connected to the frame, at least one movement drive for driving at least one of the running units, wherein the at least one movement drive is connected to the frame, a material roll receiving means for receiving a material roll to be transported, wherein the material roll receiving means is supported by the frame, and comprising a communications device with a receiver unit for receiving external information items, the communications device being connected to the frame and being in signal connection with the at least one movement drive for actuating the latter.

According to the invention, said object is further achieved by an arrangement comprising a transport trolley according to the invention and a material roll to be transported, wherein the material roll projects in its longitudinal direction, in particular on both sides, with respect to the transport trolley.

According to the invention, said object is further achieved by a corrugated board plant with at least one transport trolley according to the invention.

The core of the invention lies in a transport trolley which comprises at least one dedicated movement drive for driving (in particular, in a direct or indirect manner) at least one running unit which can be driven. Furthermore, said transport trolley has a communications device with a receiver unit for receiving external information items and/or signals which are, for example, movement, target and/or surrounding area information items.

A material roll can be received in the material roll receptacle, which material roll is formed by way of a material web which is rolled up, and is preferably required for producing corrugated board. The material roll receptacle is favorably accessible from above. It preferably extends along the transport trolley. An empty inner carrying core of a material roll can also be received in the material roll receptacle, however.

The frame is favorably self-supporting. It is advantageous if the frame is in one piece. As an alternative, the frame is in multiple pieces.

The running units are preferably configured as wheel units which, for example, in each case comprise a wheel or a double wheel. As an alternative, the running units are, for example, chain units or sliding units. Combinations are possible. The running units are preferably arranged directly or indirectly on the frame or are mounted on the latter.

The ground is preferably formed from concrete, in particular fiber concrete. It preferably extends horizontally. The at least one transport trolley can preferably be moved horizontally.

The at least one movement drive is preferably configured as an electric drive. It is preferably arranged directly or indirectly on the frame. The at least one movement drive is favorably in a direct or indirect drive connection with the running unit/units to be driven. It has a motor.

The communications device preferably operates in a wireless manner. It is expedient if, in addition to a receiver unit for receiving external information items, for example from a central control device and/or an auxiliary controller, the communications device also comprises a transmitting unit for transmitting information items and/or signals, for example of respective positional, movement, surrounding area and/or load information items, to the central control device. The transport trolley can preferably be sent to any desired locations. It can preferably be moved without rails.

The transport trolley can be implemented particularly simply by way of a central control device. The central control device preferably coordinates the at least one transport trolley, favorably a multiplicity of transport trolleys.

The material roll receptacle is preferably channel-like. This embodiment results in a transport trolley which permits extremely safe transport of the material roll to be transported. Furthermore, material rolls with different external diameters can be received and/or transported in this way in a particularly safe manner Centering of the material roll with respect to the transport trolley in the transverse direction of the material roll can thus be achieved in a simple manner. The material roll receptacle is preferably delimited laterally and/or on the longitudinal side by way of a corresponding wall. It preferably has a bottom and lateral guides which lie opposite one another. The material roll receptacle or wall preferably has at least one curved and/or straight section, for example.

The material roll receptacle is preferably not delimited in the longitudinal direction. Said embodiment permits a relative longitudinal movement between the transport trolley and a material roll to be received or dispensed, which material roll is raised, in particular slightly, with respect to the transport trolley. The transport trolley can thus be moved simply below the raised material roll and can be moved away from the latter along the material roll receptacle or the material roll. A movement takes place here in the axial direction of the material roll. Collision points between the transport trolley and the material roll do not exist. The material roll receptacle is thus preferably open or free in its longitudinal direction.

The transport trolley, in which the material roll receiving means is at most at a spacing of 100 mm with respect to the ground at its lowest receiving point in its transport position, has an extremely low centroid in the loaded state and is thus particularly protected against tipping. Furthermore, a functionally reliable transfer between a material roll and a web dispensing apparatus of the corrugated board plant is thus possible.

The transport trolley, in which the material roll receiving means is supported with respect to the frame by means of at least one spring unit, the at least one spring unit preferably being prestressed, has a particularly long service life. A vertical movement of the material roll receptacle with respect to the frame with compression of the at least one spring unit takes place, in particular, in the case of loading of the transport trolley with an excessively heavy material roll. The at least one spring unit is preferably a constituent part of an overload protection device. It favorably acts in a vertical direction.

It is advantageous if the spring unit is configured as a deformable material block or spring. The spring can be, for example, a gas spring, hydraulic spring or metallic spring, such as a helical spring or cup spring. The maximum loadbearing capacity of the transport trolley preferably lies between 4 t and 6 t.

The transport trolley, in which the material roll receiving means has, at the bottom, at least one supporting element for support with respect to a ground in case of compression of the at least one spring unit, has a particularly long service life. The at least one supporting element is preferably plate-like and dimensionally stable. It can preferably be moved with respect to the frame, in particular in the case of overloading.

The guide for a guided vertical movement of the material roll receiving means with respect to the frame, wherein the guide acts between the material roll receiving means and the frame, is favorably formed by way of at least two bodies, flanks, walls or the like of the material roll receptacle and of the frame which are arranged adjacently with respect to one another.

The transport trolley comprising an energy storage unit for outputting electric energy to the at least one movement drive can preferably be driven autonomously. It is expedient if the energy storage unit is configured as a battery or accumulator. In the case of discharge, stored chemical energy is preferably converted into electric energy by way of electrochemical reaction. The transport trolley is thus independent of a power grid or an indoor installation.

It is expedient if the energy storage unit can be charged, in particular inductively. The energy storage unit can favorably be charged in the case of a transport trolley which is moving and/or at a standstill.

The material roll detection sensor for detecting a loading state of the transport trolley is configured, for example, as a weight sensor or visual sensor. It is expedient if the material roll detection sensor is assigned to the material roll receptacle. It is capable, in particular, of detecting whether the transport trolley is loaded or unloaded. It is advantageous if a corresponding information item can be sent via the communications device to the central control device of the corrugated board system.

The at least one safety device for prevention accidents is preferably of a visual type. It is configured, for example, as a camera, a sensor or the like. It is expedient if the at least one safety device optionally sends corresponding risk information items via the communications device to the central control device. It is advantageous if the at least one safety device detects immovable and/or movable objects during use.

In particular, the central control device also assumes the monitoring of at least one risk and/or protective region. An access control to the at least one protective region takes place, for example, in an electronic/visual manner, in particular by means of at least one (laser) light barrier or a light curtain. The at least one transport trolley which is situated in the protective region is then favorably shut down immediately in the case of a risk being identified.

Enabling after a risk has been identified preferably takes place by way of an operating person, for example by way of an acknowledgement. As an alternative, enabling is possible automatically by means of a transponder on the operating person, in particular on his/her clothing. As soon as the operating person leaves the protective region, said region is favorably enabled again, and the at least one transport trolley which has been shut down is started up again. The central control device preferably controls a central safety concept, with the result that the at least one transport trolley can be implemented in a comparatively simple manner.

The at least one movement path detection device for controlling the transport trolley along a predefined movement path is favorably of a visual type. It is preferably configured as a camera, a sensor or the like. It is expedient if the at least one movement path detection device is capable of detecting a corresponding movement path specification arrangement as a movement path, which arrangement is configured, for example, as a marking on a ground, such as a hall floor. The transport trolley follows the movement path specification arrangement.

The movement path marking is preferably formed by way of a coat of paint or ink, and is favorably linear. It is, for example, interrupted or free from interruptions. It is, for example, visible or invisible.

It is expedient if the movement path specification arrangement in accordance with one embodiment is formed at least partially by way of energy supply coils which are favorably arranged in the ground. As an alternative, for example, it is formed by way of a wire which is arranged on or in the ground.

It is expedient if there is a closed, in particular fully automatic, material roll or transport trolley circuit. The movement path can preferably be specified as desired, which simplifies the planning of the remaining infrastructure. As an alternative, the at least one transport trolley can be moved along an imaginary movement path which is defined, for example, in a software program. An imaginary movement path is understood to mean, in particular, a movement path which is not specified in a real or tangible way. The imaginary movement path can also be called, for example, a hypothetically specified movement path. The at least one transport trolley can be controlled, for example, via a software control program.

The transport trolley comprising at least one auxiliary control device for connecting to an external auxiliary controller for manual actuating the transport trolley can also be actuated on site. The external auxiliary control is preferably a portable remote controller. It is expedient if the connection between the auxiliary control device and the auxiliary control is wireless or wired. A unidirectional or bidirectional signal and/or information transmission is preferably possible. For example, overtaking of other transport trolleys is thus possible. In particular, controlling or moving of the transport trolley away from the actual movement path is thus possible. The energy then preferably comes from the energy storage unit.

The refinement comprising at least one emergency shutdown device for rapidly setting the transport trolley into a safe state, leads to a particularly safe transport trolley. The at least one emergency shutdown device preferably has at least one emergency shutdown switch which is readily accessible, visible, and can be actuated manually. The at least one emergency shutdown device is favorably capable of immediately stopping the transport trolley in the case of actuation. It is advantageous if the actuated emergency shutdown device immediately interrupts the energy supply to the at least one movement drive to this end.

The transport trolley can be actuated autonomously. In particular, it is self-propelled. If there are a plurality of transport trolleys, they can be actuated and/or moved differently.

The transport trolley can be steered, in particular by way of corresponding actuation. It is capable of moving in a straight line. Furthermore, moving around bends and/or turning are/is possible. This makes the transport trolley extremely flexible. The transport trolley can preferably be moved in a manner which is free from fixedly specified movement parts. For example, it is capable of carrying out moving around bends and/or turning if, for example, its receiver unit receives corresponding, direct or indirect information items, for example from the central control device. A steering operation of the transport trolley or a deflection of at least one running unit can preferably be brought about by way of a controller of the transport trolley and/or by way of corresponding signals.

For example, at least one running unit can be deflected. This can take place, for example, in a targeted manner by way of an actuable steering device. As an alternative, for example, there are two movement drives which can be actuated separately and/or independently of one another and are drive-connected to corresponding running units. In the case of an identical actuation of the movement drives, the transport trolley moves in a straight line, whereas it carries out moving around bends and/or a turning maneuver in the case of different actuation of the movement drives. The movement drives can be actuated independently of one another and differently. They can be driven in opposite rotational directions.

The transport trolley comprising six of the running units, four of the running units being arranged in corner regions of the frame in a deflectable manner, and two of the running units being arranged in a center region of the frame in a rotationally drivable manner, wherein each of the rotationally drivable running units preferably is rotationally drivable by an own movement drive for moving and deflecting the transport trolley, has an extremely high loadbearing capability. Furthermore, it can be steered in a particularly satisfactory manner.

In an arrangement comprising a transport trolley and a material roll to be transported, in which the material roll projects in its longitudinal direction, in particular on both sides, with respect to the transport trolley, the material roll favorably projects homogeneously with respect to the transport trolley. In terms of its longitudinal direction or axial direction, the material roll preferably covers the transport trolley completely.

It is expedient if the material roll projects in its transverse direction, in particular on both sides, with respect to the transport trolley. The material roll favorably projects uniformly with respect to the transport trolley. In its transverse direction, that is to say perpendicularly with respect to its longitudinal direction, the material roll preferably covers the transport trolley completely.

The corrugated board plant, in which the at least one transport trolley is capable of navigating crossroads, favorably has at least one intermediate web dispensing apparatus for dispensing at least one intermediate web, and at least one top web dispensing apparatus for dispensing at least one top web, and at least one laminating web dispensing apparatus for dispensing a laminating web.

Furthermore, the corrugated board plant preferably comprises at least one corrugated board production apparatus which is arranged downstream of the at least one intermediate web dispensing apparatus and top web dispensing apparatus, for producing at least one corrugated board web which is laminated on one side from the at least one top web and intermediate web.

Moreover, the corrugated board plant preferably has a connecting apparatus for connecting the at least one corrugated board web which is laminated on one side to the laminating web with the formation of a corrugated board web which is laminated on both sides.

Furthermore, for example, the corrugated board plant has a cross-cutting apparatus for cutting the corrugated board web which is laminated on both sides into sheets. It is expedient if, moreover, the corrugated board plant has a stacking apparatus for stacking the sheets.

Moreover, the corrugated board plant preferably has a control device for actuating the at least one transport trolley.

In the following text, preferred exemplary embodiments of the invention will be described by way of example with reference to the appended drawing.

DESCRIPTION OF THE PREFERRED EMBODIMENTS

Figure 1:
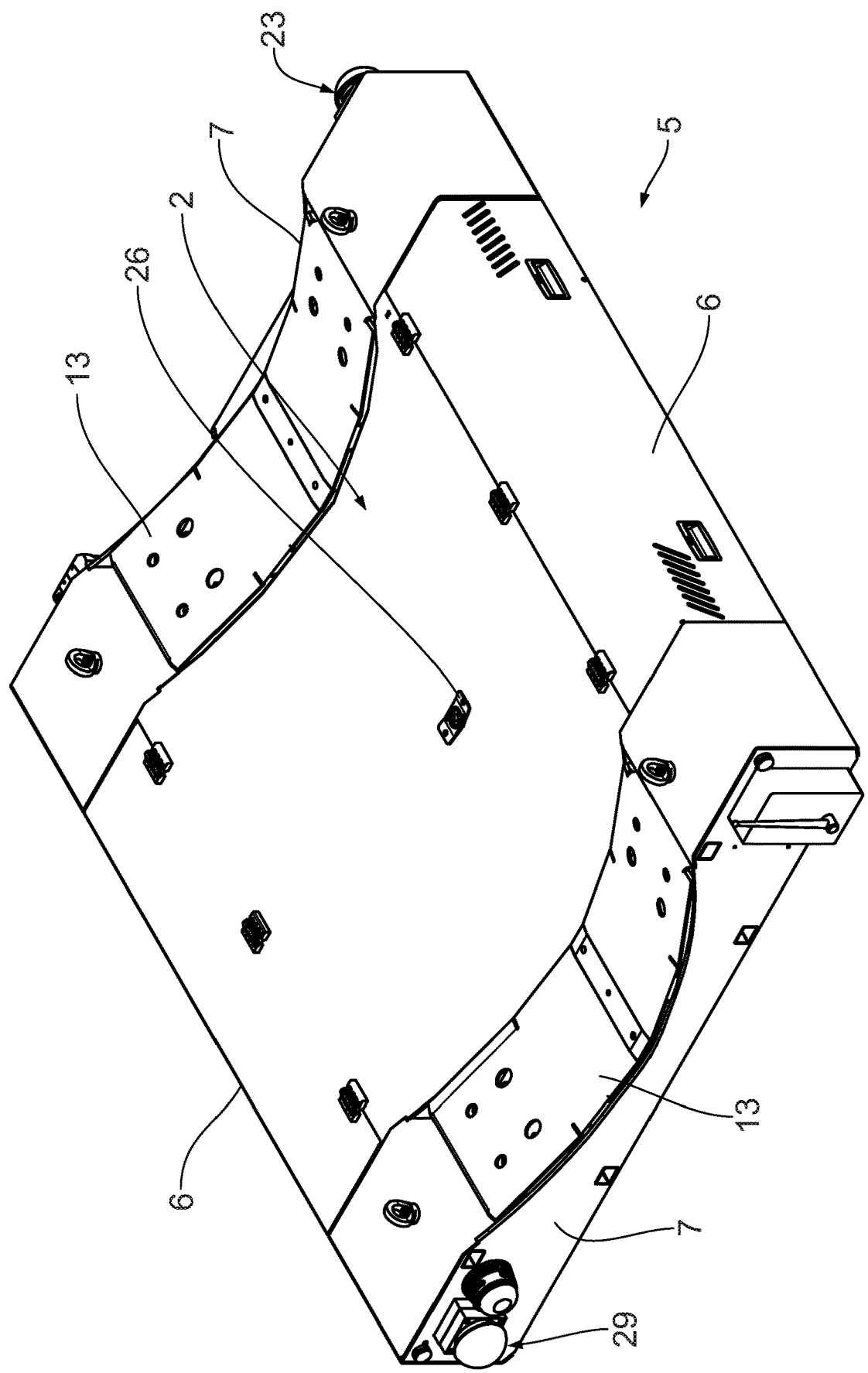
FIG. 1 shows a perspective view of a transport trolley according to the invention.
Figure 2:
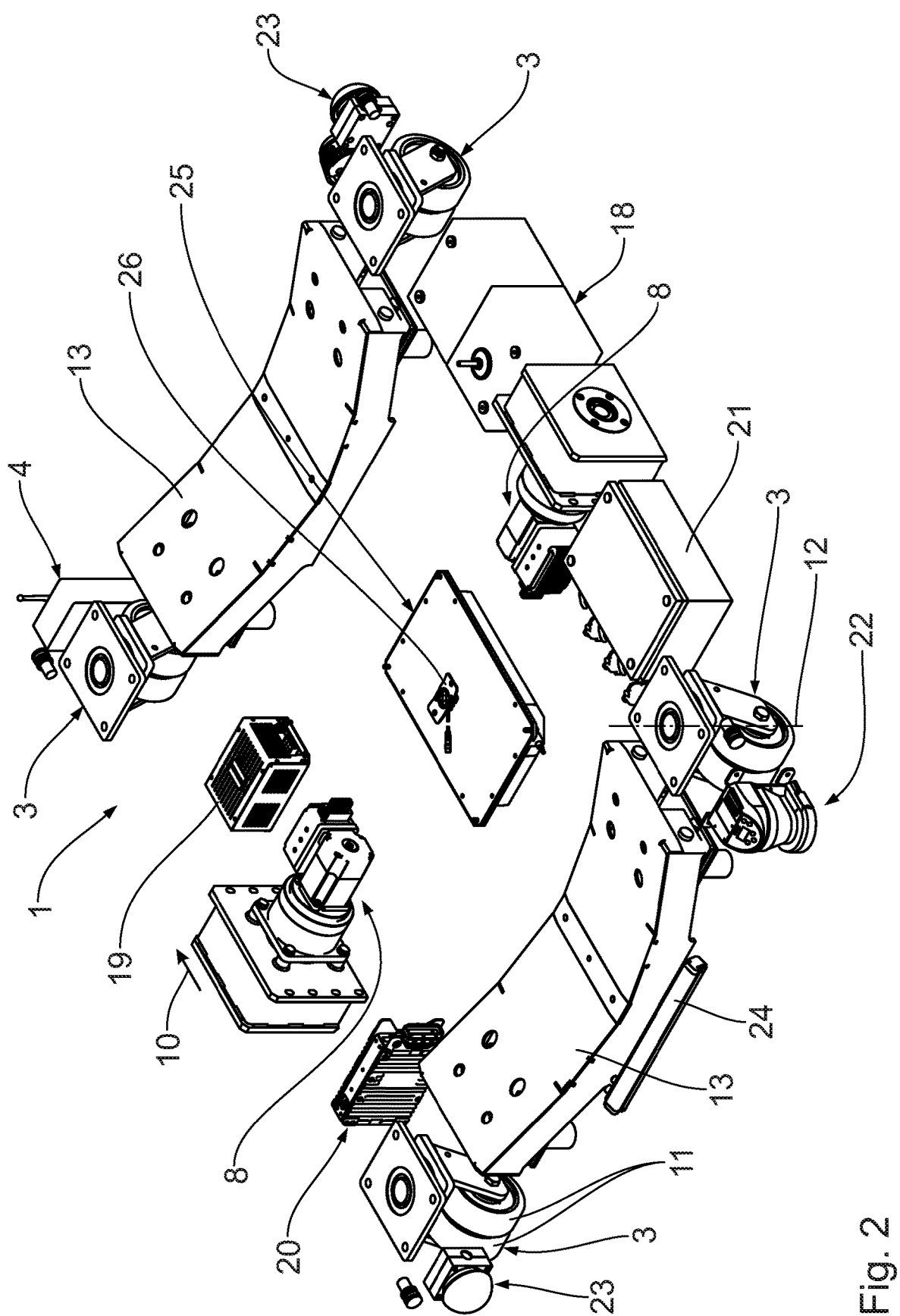
FIG. 2 shows an exploded view which illustrates the essential parts of the transport trolley which is shown in FIG. 1.
Figure 3:
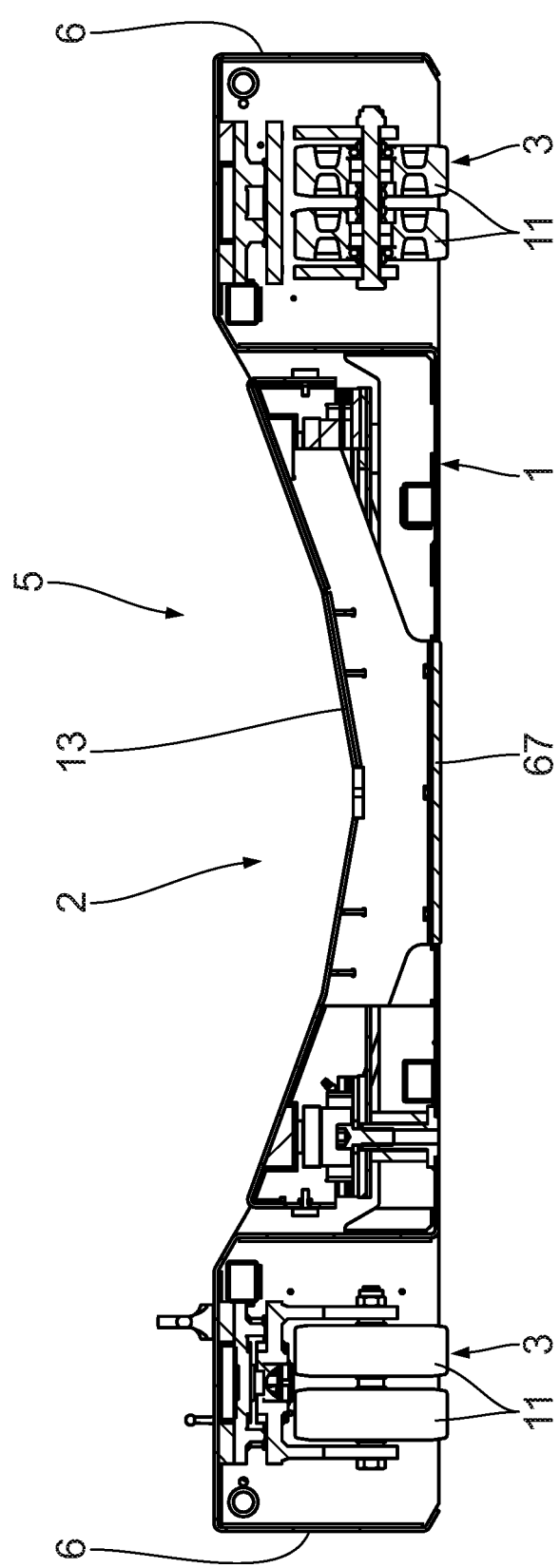
FIG. 3 shows a cross section through the transport trolley which is shown in FIGS. 1 and 2.

Making reference first of all to FIGS. 1 to 14, the construction of a paper roll transport trolley 5 will be described. The paper roll transport trolley 5 has a rigid frame 1 which is rack-like or chassis-like. The frame 1 supports a paper roll receptacle 2 for a finite rolled-up paper web, a plurality of wheel units 3 for moving the paper roll transport trolley 5 on a ground, and a communications device 4.

The paper roll transport trolley 5 can be set in motion in a manner which is dependent on signals and/or information items received via the communications device 4. Furthermore, its speed can thus be predefined, for example. Path and/or target information items can accordingly also be transmitted to the paper roll transport trolley 5. The paper roll transport trolley 5 can be moved in a straight line or around bends.

The frame 1 has two longitudinal sides 6 and two transverse sides 7. The longitudinal sides 6 run parallel to one another. They extend parallel to the paper roll receptacle 2. The transverse sides 7 also extend parallel to one another. The longitudinal sides 6 and the transverse sides 7 run at a right angle with respect to one another.

An autonomous movement drive 8 which comprises an electric motor which has a drive shaft is arranged on the frame 1 adjacently with respect to each longitudinal side 6.

A drive running wheel 9 which is mounted such that it can be rotated or can be driven rotationally is drive-connected to each movement drive 8 or its drive shaft. The rotational axes of the drive running wheels 9 are aligned with one another. They extend perpendicularly with respect to the longitudinal sides 6. The drive running wheels 9 are situated in the center in relation to a longitudinal direction 10 of the paper roll transport trolley 5. They cannot be steered.

Furthermore, a steering wheel unit 11 which in each case comprises a twin wheel is arranged on the frame 1 on each corner region of the frame 1. The twin wheels are mounted rotatably. Each steering wheel unit 11 can be deflected independently about a vertical steering axis 12. The steering wheel units 11 can be deflected freely, in particular by 360°. The steering axes 12 run parallel to one another.

The paper roll receptacle 2 is formed by way of two channel parts 13 which are arranged spaced apart from one another and are mounted in each case on the frame 1 such that they can be moved vertically. The channel parts 13 extend adjacently with respect to the transverse sides 7 between the longitudinal sides 6. Their lowest receiving point is situated centrally between the longitudinal sides 6. They are of symmetrical configuration. The channel parts 13 have their highest points adjacently with respect to the longitudinal sides 6 of the frame 1. They are open adjacently with respect to the transverse sides 7 of the frame 1 and/or in the longitudinal direction.

At the bottom, the paper roll receptacle 2 supports at least one horizontally running supporting plate 67.

Spring units 14 are arranged between the frame 1 and the channel part 13 which is arranged above the latter. Each spring unit 14 is formed by way of a compression coil spring which is prestressed and can be compressed. Coil axes 15 of the spring units 14 run vertically. The spring units 14 are supported at the top in each case on the frame 1. Furthermore, in each case one of the channel parts 13 lies at the top on at least two spring units 14. The maximum spring travel of the spring units 14 favorably lies in each case between 3 mm and 10 mm, more preferably between 5 mm and 8 mm.

Guides 16 are arranged between the frame 1 and each channel part 13, which guides 16 allow a vertical movement of each channel part 13 with a change of the length of the associated spring units 14, but prevent or reduce a horizontal movement of each channel part 13 with respect to the frame 1. Each guide 16 is formed by way of a guide pin 17 which extends vertically and engages from above into an associated spring unit 14.

Moreover, an accumulator 18 is arranged on the frame 1. The accumulator 18 is a rechargeable store for electric energy for the movement drives 8.

Furthermore, a voltage regulator 19 is arranged on the frame 1. The voltage regulator 19 is connected electrically to the accumulator 18. It is capable of balancing fluctuations of the electric input voltage of the accumulator 18. The voltage regulator 19 is favorably of an electronic type. Moreover, it is connected electrically to the two movement drives 8.

Furthermore, a controller 20 is arranged on the frame 1, which controller 20 is capable of actuating the two movement drives 8 independently of one another. Moreover, the controller 20 is in signal connection with the communications device 4.

Furthermore, a terminal box 21 is arranged on the frame 1. The electronic and/or electric components of the paper roll transport trolley 5 are connected electrically to one another via the terminal box 21.

Furthermore, a safety device 22 which is configured as a scanner, in particular a laser scanner, is arranged on the frame 1 in a front corner region. The safety device 22 is in signal connection with the controller 20. It is capable of stopping the paper roll transport trolley 5 in the case of a risk being detected.

Furthermore, an emergency shutdown device 23 is arranged in each case on the end side of the paper roll transport trolley 5. In the case of actuation, each emergency shutdown device 23 is capable of immediately switching off the movement drives 8 and/or immediately interrupting the power supply to said movement drives 8.

A movement path detection device 24 which is configured as a sensor is arranged centrally at the front on the frame 1 adjacently with respect to the front transverse side 7. The movement path detection device 24 is of elongate configuration and extends horizontally. It runs perpendicularly with respect to the longitudinal direction 10 of the paper roll transport trolley 5. It is capable of detecting a predetermined movement path.

Moreover, the frame 1 has an inductive energy transmission device 25. The energy transmission device 25 is connected electrically to the accumulator 18. It is arranged in a central region of the paper roll transport trolley 5.

The energy transmission device 25 supports a paper roll detection sensor 26 at the top. The paper roll detection sensor 26 is capable of detecting whether the paper roll transport trolley 5 is loaded or unloaded. It is situated in the paper roll receptacle 2.

The paper roll transport trolley 5 can be moved by way of energization of the at least one movement drive 8. The necessary electric energy comes from the accumulator 18. The movement drives 8 indirectly receive corresponding movement signals via the movement path detection device 24 and/or for the communications device 4.

If the two drive running wheels 9 are driven equally in opposite directions, the paper roll transport trolley 5 rotates on the spot. If the one drive running wheel 9 is driven to a more pronounced extent than the other drive running wheel 9, the paper roll transport trolley 5 moves around a bend. Here, the steering wheel units 11 are adjusted automatically about the respective steering axis 12. If the two drive running wheels 9 are driven identically and in the same direction, the paper roll transport trolley 5 moves in a straight line. The steering wheel units 11 are automatically set correspondingly for straight ahead movement.

Figure 5:
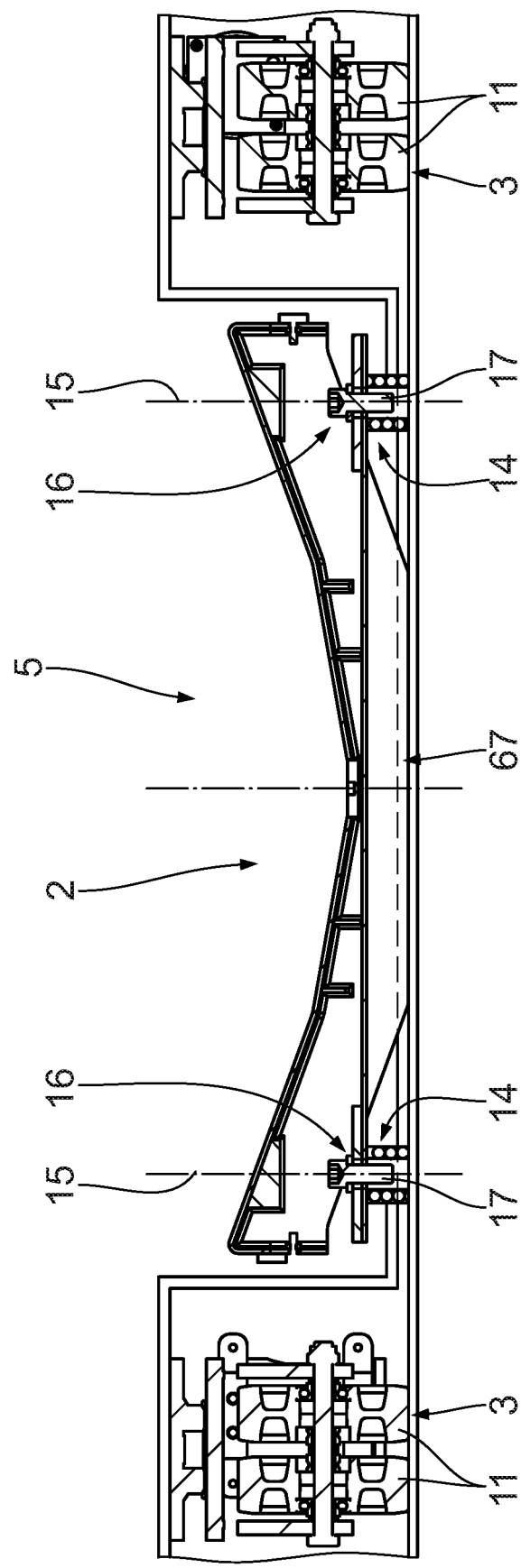
FIG. 5 shows a cross section in accordance with FIG. 4, the spring units thereof now being situated in a loaded, compressed state.
Figure 6:
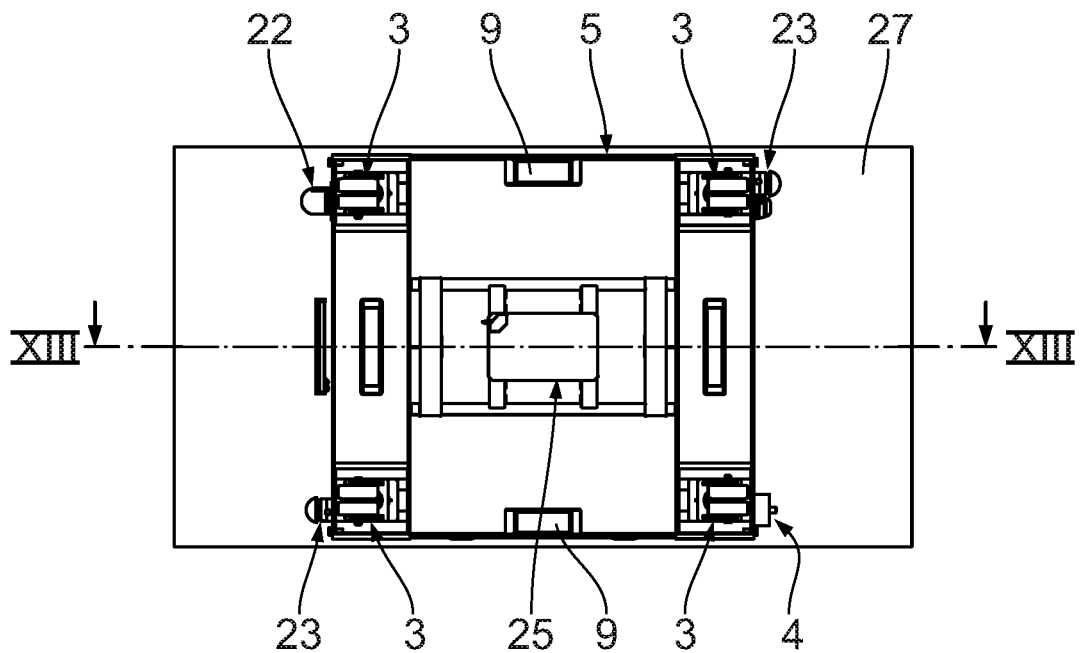
FIG. 6 shows a view from below which shows the transport trolley which is illustrated in FIGS. 1 to 5 and a material roll which is arranged on said transport trolley.
Figure 7:
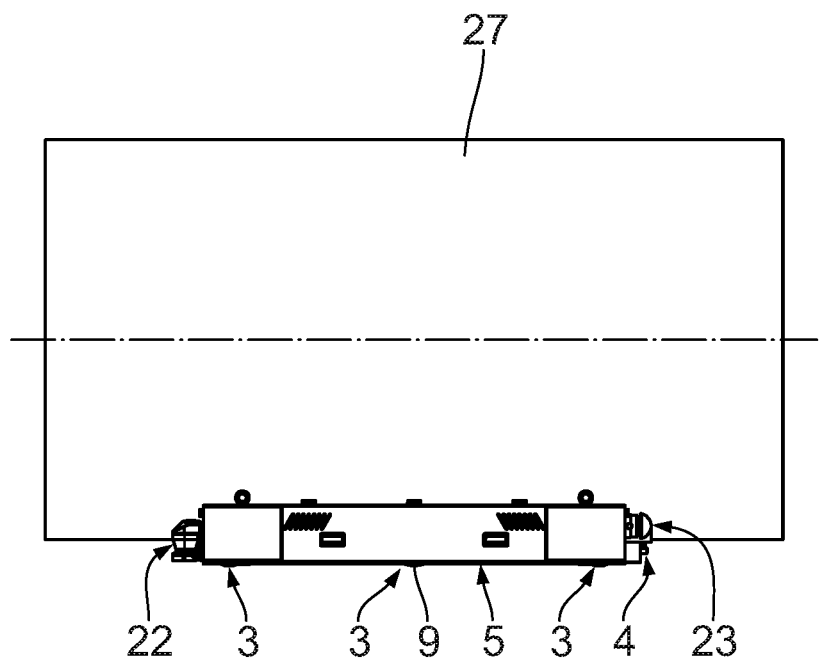
FIG. 7 shows a side view of the arrangement according to the invention which is shown in FIG. 6 and consists of a transport trolley and a material roll.
Figure 8:
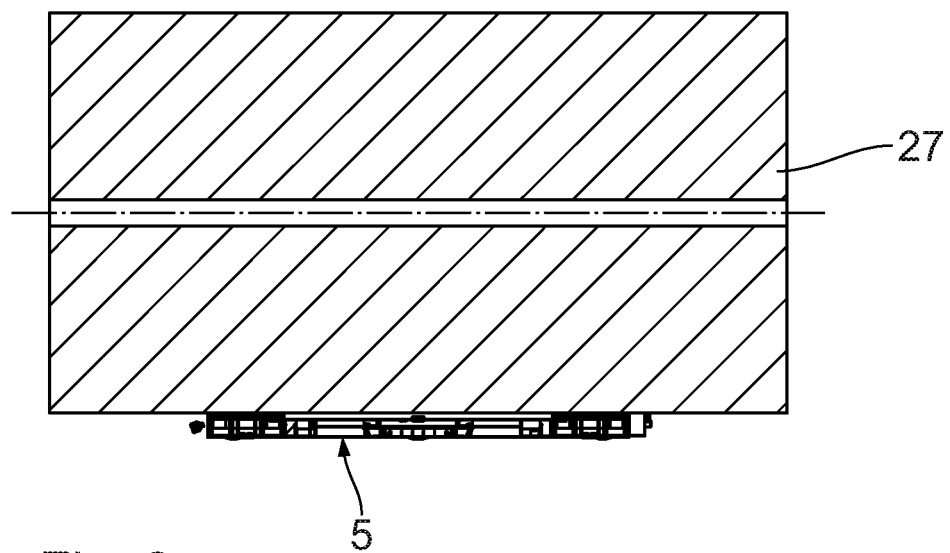
FIG. 8 shows a longitudinal section through the arrangement which is shown in FIG. 6 and consists of a transport trolley and a material roll, in accordance with the sectional line VIII-VIII in FIG. 6.
Figure 9:
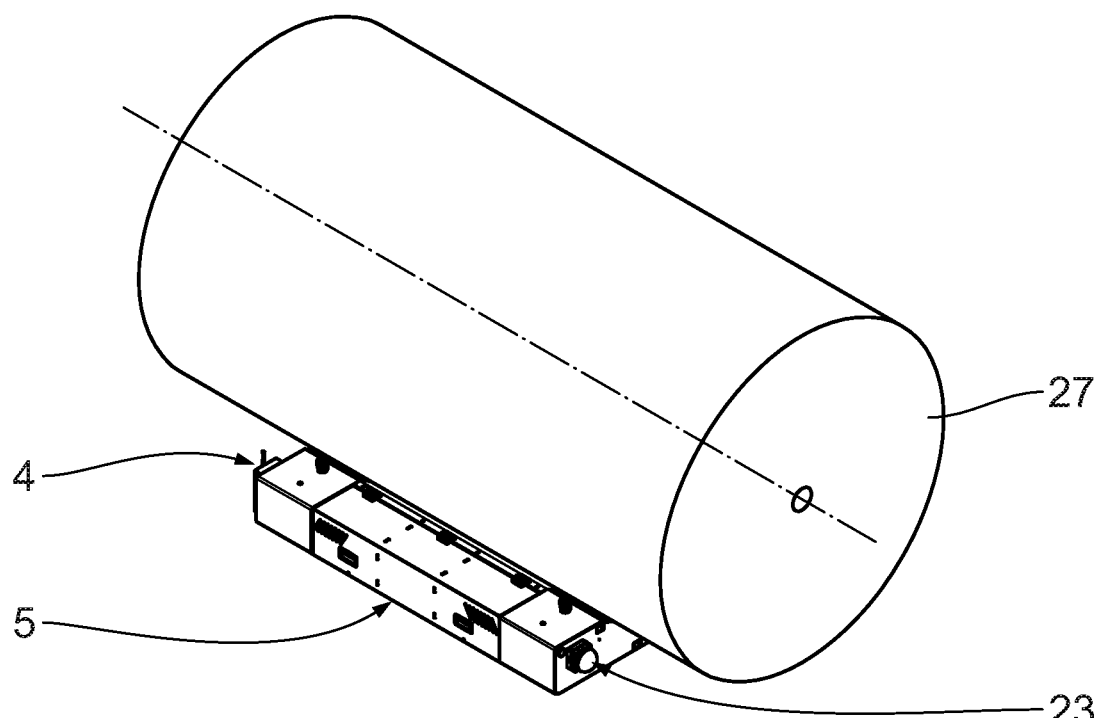
FIG. 9 shows a perspective view of the arrangement which is shown in FIGS. 6 to 8 and consists of a transport trolley and a material roll.
Figure 10:
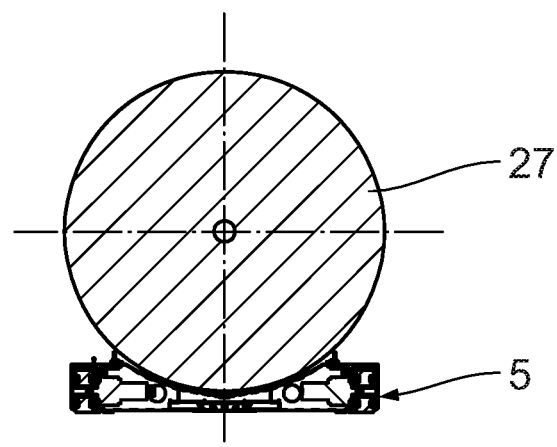
FIG. 10 shows a cross section through the arrangement which is shown in FIGS. 6 to 9 and consists of a transport trolley and a material roll.
Figure 11:
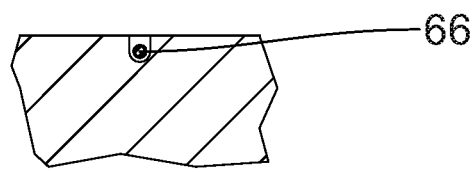
FIG. 11 shows an energy supply coil which is arranged in a ground.
Figure 12:
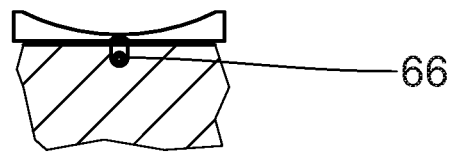
FIG. 12 shows a view which illustrates the energy supply coil which is shown in FIG. 11 and a transport trolley which is situated above said energy supply coil.
Figure 13:
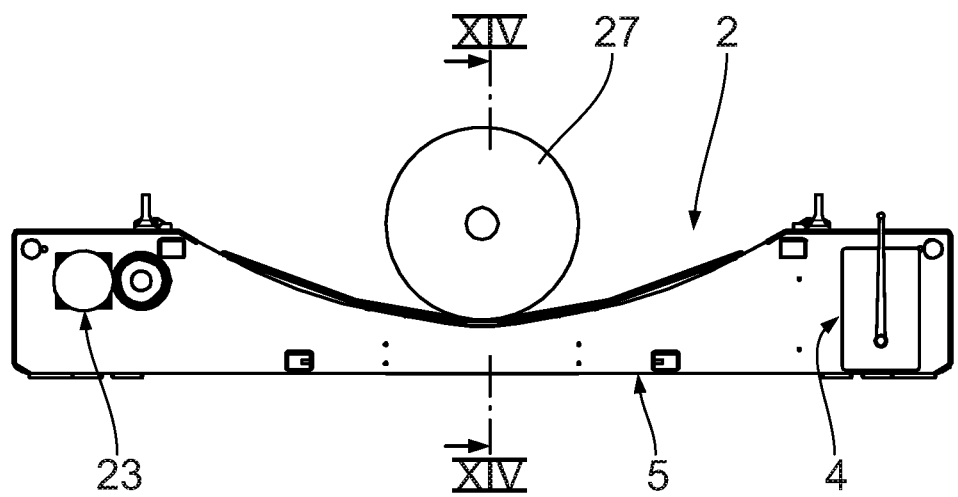
FIG. 13 shows a further arrangement consisting of an illustrated transport trolley according to the invention and a material roll, the material roll having a reduced external diameter in comparison with FIGS. 6 to 10.
Figure 14:
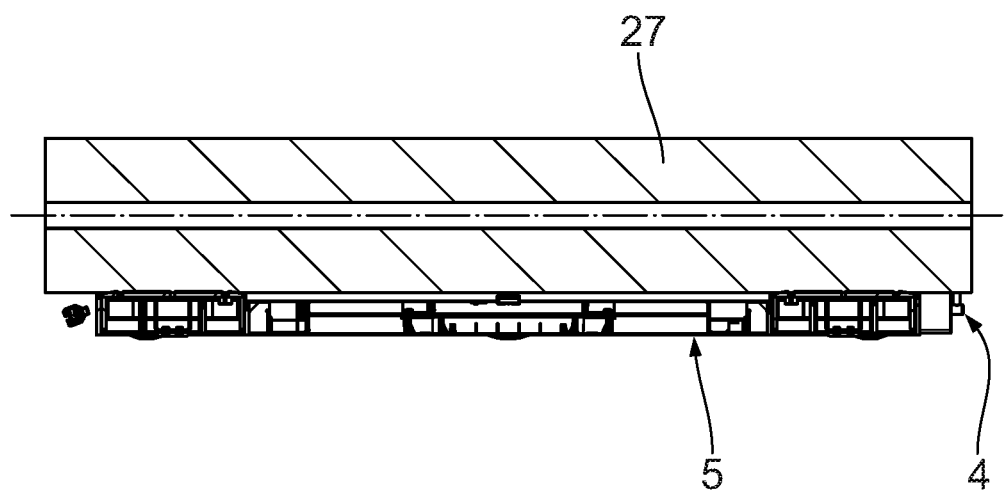
FIG. 14 shows a longitudinal section through the arrangement according to the invention which is shown in FIG. 13 and consists of a transport trolley and a material roll, in accordance with the sectional line XIV-XIV in FIG. 13.

If the paper roll transport trolley 5 is loaded with a paper roll 27, the channel parts 13 are moved downward counter to the spring force of the spring units 14 and in a guided manner with respect to the frame 1 in the case of overloading (FIG. 5). Here, the at least one supporting plate 67 comes into contact with the ground. The paper roll transport trolley 5 is protected in this way.

The prestressed spring units 14 still hold the paper roll 27 and/or the channel parts 13 in position even in the case of a maximum paper roll weight, such as five tons. In the case of overloading (dynamic or static), the spring units 14 yield until the paper roll receptacle 2 compresses to such an extent that the at least one supporting plate 67 comes into contact with the ground and thus dissipates the overloading directly into the ground without overloading the paper roll transport trolley 5 in the process.

The paper roll 27 which is arranged in the paper roll receptacle 2 lies on the paper roll detection sensor 26 which thus detects loading by way of the paper roll 27. It extends horizontally.

The paper roll 27 lies on the channel parts 13. The channel parts 13 bear over a part circumferential region of the paper roll 27 against the latter on the bottom and/or on the side. The paper roll 27 favorably projects in the longitudinal direction 10 uniformly with respect to the paper roll transport trolley 5.

Figure 4:
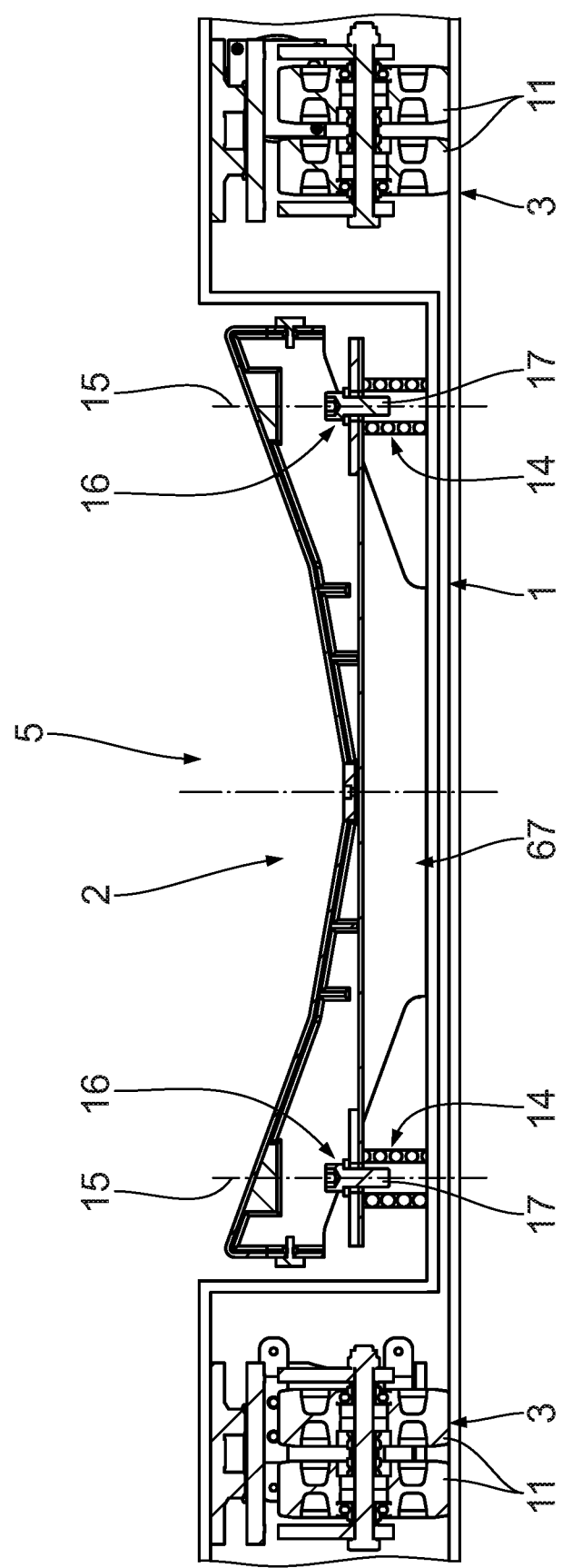
FIG. 4 shows a further cross section through the transport trolley which is shown in FIGS. 1 to 3, the spring units thereof being situated in an unloaded state.

In the case of unloading of the paper roll 27, the spring units 14 rebound again, in so far as they have compressed on account of overloading, and move the channel parts 13 upward in a guided manner (FIG. 4).

Each unrolling unit of each splicing apparatus/web dispensing apparatus favorably has an unrolling arm arrangement for rotatably mounting the respective paper roll 27. The respective unrolling arm arrangement preferably at least partially describes a circular arc movement, in particular in the case of lifting, which leads to particularly precise receiving of the paper roll 27 in the paper roll receptacle 2, even in the case of different diameters. This results in an offset of the paper roll center with respect to the mandrel of the respective unrolling unit.

In a corrugated board plant which will be described in the following text with reference to FIG. 15, a plurality (preferably between 15 and 25) of the paper roll transport trolleys 5 are used. They are used, in order to feed paper rolls 27 to a corrugated board production line of the corrugated board plant for producing corrugated board, and to transport said paper rolls 27 away again.

The corrugated board production line extends along a corrugated board production direction. It comprises a first corrugated board production apparatus 28 for producing a first corrugated board web which is laminated on one side.

A first top web splicing apparatus 29 and a first intermediate web splicing apparatus 30 are arranged upstream of the first corrugated board production apparatus 28. The first top web splicing apparatus 29 comprises a first unrolling unit for unrolling a finite first top web from a first top web roll, and a second unrolling unit for unrolling a finite second top web from a second top web roll. The finite first top web and second top web are connected to one another by means of a connecting and cutting unit of the first top web splicing apparatus 29 in order to provide an endless first top web.

The first intermediate web splicing apparatus 30 is configured in a corresponding manner with respect to the first top web splicing apparatus 29. Said first intermediate web splicing apparatus 30 comprises a third unrolling unit for unrolling a finite first intermediate web from a first intermediate web roll, and a fourth unrolling unit for unrolling a finite second intermediate web from a second intermediate web roll. The finite first intermediate web and second intermediate web are connected to one another by means of a connecting and cutting unit of the first intermediate web splicing apparatus 30 in order to provide an endless first intermediate web.

The endless first top web and the endless first intermediate web are fed to the first corrugated board production apparatus 28.

The first corrugated board production apparatus 28 comprises a first corrugated roll arrangement with a first corrugated roll and a second corrugated roll for producing an endless first corrugated web which has a corrugation from the endless first intermediate web. The corrugated rolls configure a first roller nip for leading through and corrugating the endless second intermediate web.

In order to connect the endless first top web to the endless corrugated first intermediate web or corrugated web to form the endless first corrugated board web which is laminated on one side, the first corrugated board production apparatus 28 has a first glue application device which preferably comprises a glue metering roll, a glue container and a glue application roll. In order to lead the endless first corrugated web through and to glue it, the glue application roll configures a nip with the first corrugated roll. The glue which is situated in the glue container is applied to peaks of the corrugation of the endless first corrugated web via the glue application roll. The glue metering roll bears against the glue application roll and serves to configure a homogeneous glue layer on the glue application roll.

The endless first top web is subsequently joined together with the endless first corrugated web which is provided with glue from the glue container in the first corrugated board production apparatus 28 for producing the first corrugated board web which is laminated on one side.

The first corrugated board production apparatus 28 has a first pressing module for pressing the endless first top web against the endless first corrugated web which is provided with glue and in turn bears in regions against the first corrugated roll. The first pressing module is favorably configured as a pressing belt module. It is arranged above the first corrugated roll. The first pressing module has two first deflection rolls and an endless first pressing belt which is guided around the two first deflection rolls.

The first corrugated roll engages in regions from below into a space between the two first deflection rolls of the first pressing module, as a result of which the first pressing belt is deflected by way of the first corrugated roll. The first pressing belt presses against the endless first top web which is in turn pressed against the endless first corrugated web which is provided with glue and bears against the first corrugated roll.

In order to buffer store the endless first corrugated board web which is laminated on one side, it is fed via a first upper transport device to a first storage apparatus, where it forms loops.

Furthermore, the corrugated board production line has a second corrugated board production apparatus 31 which is configured in a corresponding manner with respect to the first corrugated board production apparatus 28.

A second top web splicing apparatus 32 and a second intermediate web splicing apparatus 33 which are configured in a corresponding manner with respect to the first top web slicing apparatus 29 and the first intermediate web splicing apparatus 30, respectively, are arranged upstream of the second corrugated board production apparatus 31.

The second top web slicing apparatus 32 comprises a fifth unrolling unit for unrolling a finite third top web from a third top web roll, and a sixth unrolling unit for unrolling a finite fourth top web from a fourth top web roll. The finite third top web and fourth top web are connected to one another by means of a connecting and cutting unit of the second top web splicing apparatus 32 in order to provide an endless second top web.

The second intermediate web slicing apparatus 33 comprises a seventh unrolling unit for unrolling a finite third intermediate web from a third intermediate web roll, and an eighth unrolling unit for unrolling a finite fourth intermediate web from a fourth intermediate web roll. The finite third intermediate web and fourth intermediate web are connected to one another by means of a connecting and cutting unit of the second intermediate web splicing apparatus 33 in order to provide an endless second intermediate web.

The second corrugated board production apparatus 31 is capable of producing an endless second corrugated paper web which is laminated on one side from the endless second top web and intermediate web.

The second corrugated paper web which is laminated on one side is fed to a second storage apparatus, where it forms loops.

Moreover, the corrugated board production line has a laminating web splicing apparatus 34 which comprises a ninth unrolling unit for unrolling a finite first laminating web from a first laminating web roll, and a tenth unrolling unit for unrolling a finite second laminating web from a second laminating web roll. The finite first laminating web and the finite second laminating web are connected to one another by means of a connecting and cutting unit of the laminating web splicing apparatus 34 in order to provide an endless laminating web.

Downstream of the storage apparatuses and the laminating web splicing apparatus 34, the corrugated board production line has a preheating apparatus which comprises three preheating rolls which are arranged above one another. The endless corrugated board webs which are laminated on one side and the endless laminating web are fed to the preheating apparatuses.

Downstream of the preheating apparatus, the corrugated board production line has a gluing unit with gluing rolls which are dipped partially into a respective glue bath. A glue metering roll bears against each gluing roll, in order to configure a homogeneous glue layer on the adjacent gluing roll. The first corrugated board web which is laminated on one side is situated by way of its corrugated web in contact with a first gluing roll, with the result that the corrugation of said corrugated web is provided with glue from the glue bath. The second corrugated board web which is laminated on one side is situated by way of its corrugated web in contact with a second gluing roll, with the result that the corrugation of said corrugated web is provided with glue from the associated glue bath.

Downstream of the gluing unit, the corrugated board production line has a connecting apparatus 35 which is configured as a heating/pressing apparatus and comprises a horizontally running heating table. An endless pressing belt which is guided around guide rolls is arranged adjacently with respect to the heating table. A pressing nip is configured between the pressing belt and the heating table, through which pressing nip the corrugated board webs which are laminated on one side and the endless laminating web are guided with the formation of the endless (here, five-layer) corrugated board web.

Downstream of the connecting apparatus 35, the corrugated board production line has a rotary shear apparatus.

Downstream of the rotary shear apparatus, the corrugated board production line comprises a slitter/grooving apparatus.

Downstream of the slitter/grooving apparatus, the corrugated board production line has a cross-cutting apparatus, in order to produce sheets from the endless corrugated board web or from part webs thereof.

A conveyor belt device is arranged downstream of the cross-cutting apparatus, in order to convey the sheets further. A delivery apparatus is arranged downstream of the conveyor belt device.

A paper roll store 36 of the corrugated board plant is situated adjacently with respect to the corrugated board production line, in which paper roll store 36 a multiplicity of (favorably, different) paper rolls 27 for the splicing apparatuses 29, 30, 32, 33, 34 are stored.

A transfer point 36a is situated adjacently with respect to the paper roll store 36, where the paper rolls 27 are transferred from the paper roll store 36 to the respective paper roll transport trolley 5, for example in a manual or automated manner.

Figure 15:
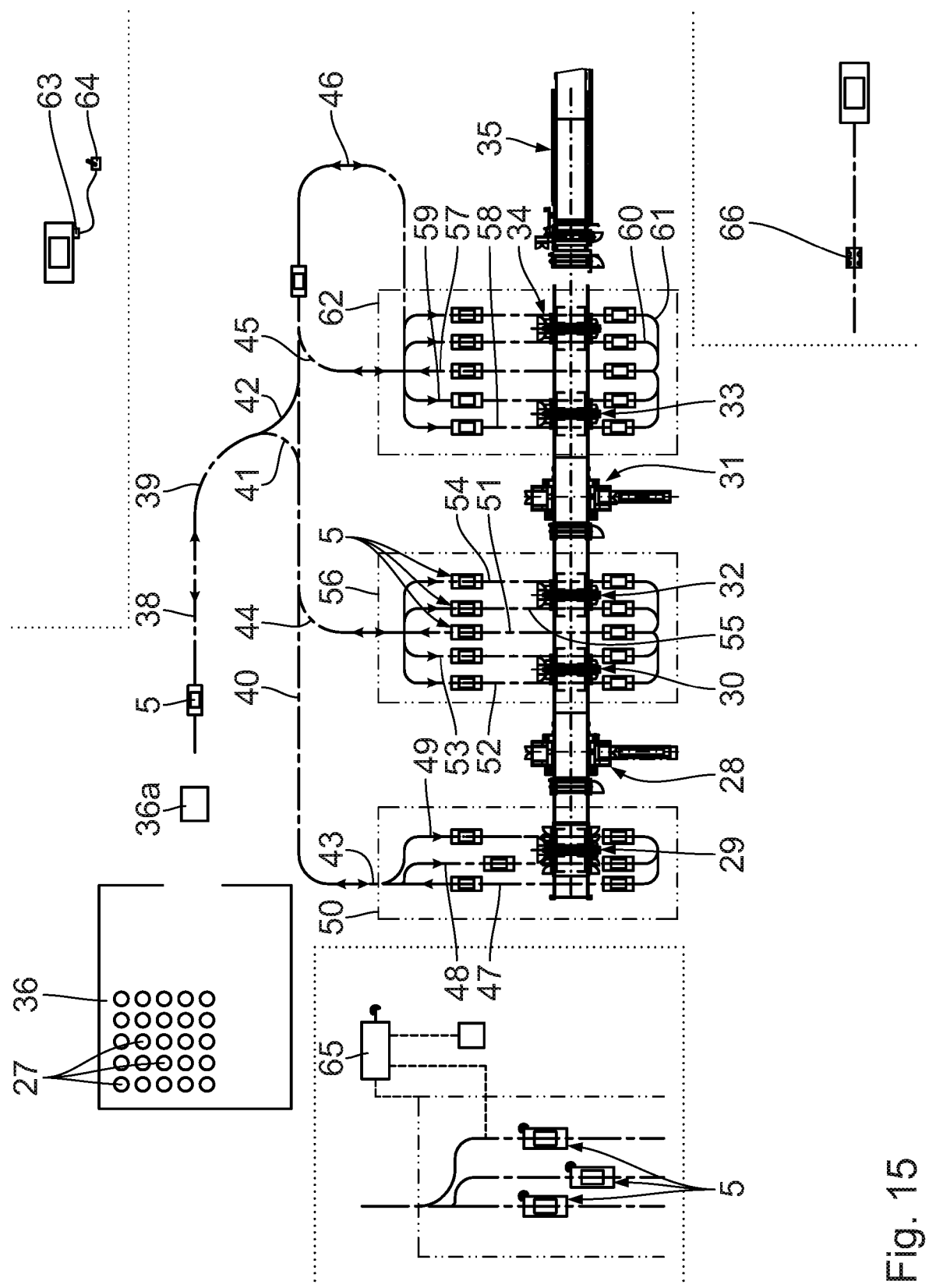
FIG. 15 shows a partial plan view of a simplified corrugated board plant according to the invention in accordance with a first embodiment, in which plant transport trolleys and the movement paths thereof are also shown.

FIG. 15 also shows movement path markings 38 which indicate and specify the movement paths of the paper roll transport trolleys 5 in the corrugated board plant. The movement path markings 38 are visible and are applied as a coat of paint to a planar ground which supports the corrugated board plant. They can be detected by the movement path detection devices 24 of the paper roll transport trolleys 5. In normal operation, during movement, the paper roll transport trolleys 5 follow the movement path markings 38 which comprise bends, switches, crossings and straight sections. The central control device 65 specifies how the paper roll transport trolley 5 is to move in the case of switches, crossings or the like. The maximum movement speed of the paper roll transport trolleys 5 preferably lies at 0.4 m/s.

As FIG. 15 shows, the transfer point 36a is adjoined by a feed/discharge path 39, where the paper roll transport trolleys 5 move in opposite directions during operation of the corrugated board plant. The feed/discharge path 39 has a straight section which adjoins the transfer point 36a, and a curved section on the end side.

The curved section of the feed/discharge path 39 is adjoined by a distribution path 40. The paper roll transport trolleys 5 move on the distribution path 40 in opposite directions to one another during operation of the corrugated board plant. The distribution path 40 extends parallel to the straight section of the feed/discharge path 39 and the corrugated board production line. It runs between the straight section of the feed/discharge path 39 and the corrugated board production line. The feed/discharge line 39 adjoins the distribution path 40 laterally in a manner which is spaced apart from the ends of the distribution path 40.

A first switch 41 and a second switch 42 are situated between the distribution path 40 and the feed/discharge path 39. In a manner which is dependent on the selected switches 41, 42, the paper roll transport trolleys 5 are guided accordingly into the distribution path 40. The paper roll transport trolleys 5 can thus also be guided from the distribution path 40 via the respective switch 41, 42 back to the feed/discharge path 39 again.

The distribution path 40 is adjoined on the end side by a first top web path 43 via a 90° bend. The distribution path 40 is adjoined via a further 90° bend by an intermediate web/top web path 44 which extends parallel to the first top web path 43. The distribution path 40 is adjoined via a further 90° bend by an intermediate web/laminating web path 45 which runs parallel to the intermediate web/top web path 44. The distribution path 40 is adjoined on the end side via a further 90° bend by an alternative path 46. The intermediate web/top web path 44 is arranged between the first top web path 43 and the intermediate web/laminating web path 45. The intermediate web/laminating web path 45 is arranged between the intermediate web/top web path 44 and the alternative path 46.

The first top web path 43 and the intermediate web/top web path 44 can be reached from the feed/discharge path 39 via the first switch 41. The intermediate web/laminating web path 45 and the alternative path 46 can be reached from the feed/discharge path 39 via the second switch 42. The alternative path 46 serves to improve the movement paths of the paper roll transport trolleys 5.

The first top web path 43 is adjoined by a top web return path 47 which runs in a straight line and is aligned with the first top web path 43. The first top web path 43 is adjoined via a switch and a bend by a first top web feed path 48 and, via a further switch and a further bend, by a second top web feed path 49.

The top web return path 47, the first top web feed path 48 and the second top web feed path 49 run mainly in each case in a straight line, parallel to one another, and extend in each case perpendicularly with respect to the corrugated board production line. They are in each case one-way paths and run through the corrugated board production line. The top web feed paths 48, 49 are aligned with the unrolling units of the first top web splicing apparatus 29.

The top web return path 47, the first top web feed path 48 and the second top web feed path 49 are situated in a first laser scanner protective region 50. By means of a light curtain and an on-person transponder, movements which entail risk are stopped by the central control device 65 in the case of the laser scanner protective region 50 being entered, and are also enabled again, without it being necessary for an operating person to enable the corresponding locations again.

The intermediate web/top web path 44 is adjoined by an intermediate web/top web return path 41 which runs in a straight line and is aligned with the intermediate web/top web path 44. The intermediate web/top web path 44 is adjoined via a switch and a bend by a first intermediate web feed path 42. Furthermore, the intermediate web/top web path 44 is adjoined via a further switch and a further bend by a second intermediate feed path 53. Furthermore, the intermediate web/top web path 44 is adjoined via a further switch and a further bend by a third top web feed path 54. Furthermore, the intermediate web/top web path 44 is adjoined via a further switch and a further bend by a fourth top web feed path 55.

The first intermediate web feed path 52, the second intermediate web feed path 53, the third top web feed path 54, the fourth top web feed path 55 and the intermediate web/top web return path 51 in each case run mainly in a straight line, parallel to one another and perpendicularly with respect to the corrugated board production line. They are in each case one-way paths. The first intermediate web feed path 52 and the second intermediate web feed path 53 are aligned with the unrolling units of the first intermediate web splicing apparatus 30. The third top web feed path 54 and the fourth top web feed path 55 are aligned with the unrolling units of the second top web splicing apparatus 32.

The first intermediate web feed path 52, the second intermediate web feed path 53, the third top web feed path 54, the fourth top web feed path 55 and the intermediate web/top web return path 51 run through the corrugated board production line and are situated in a second laser scanner protective region 56. By means of a light curtain and an on-person transponder, movements which entail risk are stopped in the case of the second laser scanner protective region 56 being entered, and are also enabled again, without it being necessary for an operating person to enable the corresponding locations again.

The intermediate web/laminating web path 45 is adjoined by an intermediate web/laminating web return path 57 which runs in a straight line and is aligned with the intermediate web/laminating web path 45. The intermediate web/laminating web path 45 is adjoined via a switch and a bend by a third intermediate web feed path 58. The intermediate web/laminating web path 45 is adjoined via a switch and a bend by a fourth intermediate web feed path 59. The intermediate web/laminating web path 45 is adjoined via a switch and a bend by a first laminating web feed path 60. The intermediate web/laminating web path 45 is adjoined via a switch and a bend by a second laminating web feed path 61.

The third intermediate web feed path 58, the fourth intermediate web feed path 59, the first laminating web feed path 60, the second laminating web feed path 61 and the intermediate web/laminating web return path 57 in each case run mainly in a straight line, parallel to one another and perpendicularly with respect to the corrugated board production line. The third intermediate web feed path 58 and the fourth intermediate web feed path 59 are aligned with the unrolling units of the second intermediate web splicing apparatus 33. The first laminating web feed path 60 and the second laminating web feed path 61 are aligned with the unrolling units of the laminating web splicing apparatus 34.

The third intermediate web feed path 58, the fourth intermediate web feed path 59, the first laminating web feed path 60, the second laminating web feed path 61 and the intermediate web/laminating web return path 57 run through the corrugated board production line and are situated in a third laser scanner protective region 62. By means of a light curtain and an on-person transponder, movements which entail risk are stopped in the case of the third laser scanner protective region 62 being entered, and are also enabled again, without it being necessary for an operating person to enable the corresponding locations again.

In the following text, the transport of the paper rolls 27 via the paper roll transport trolleys 5 in the corrugated board plant will be described in greater detail. A central control device 65 of the corrugated board plant brings about the fetching of a paper roll 27 to be used from the paper roll store 36 for the corrugated board production in the corrugated board production line via a paper roll transport trolley 5. To this end, a paper roll transport trolley 5 moves to the transfer point 36a if it is not yet situated there. The paper roll 27 is loaded onto the paper roll transport trolley 5 there. It lies in the paper roll receptacle 2 in a centered manner.

Subsequently, the central control device 65 sends the loaded paper roll transport trolley 5 to the splicing apparatus 29, 30, 32, 33 or 34 which requires the paper roll 27.

The paper roll transport trolleys 5 can move in a laterally offset manner with respect to the movement path marking 38, in particular, by way of targeted actuation. The paper rolls 27 can thus be aligned in accordance with the external diameter thereof exactly according to the splicing apparatus 29, 30, 32, 33 or 34 to be equipped or according to the transfer point 36a. As an alternative, the paper roll transport trolley 5 is configured to move the paper roll 27 axially with respect to it or with respect to the frame 1.

In order to equip a splicing apparatus 29, 30, 32, 33 or 34, the paper roll transport trolley 5 first of all moves along the feed/discharge path 39 in the direction of the distribution path 40.

If the first top web splicing apparatus 29 is to be equipped again with the paper roll 27, the paper roll transport trolley 5 moves via the first switch 41 onto the distribution path 40, and passes the intermediate web/top web path 44. Said paper roll transport trolley 5 then passes via the first top web path 43 to the first top web feed path 48 or the second top web feed path 49. In a manner which is dependent on the required equipping of the first or second unrolling unit of the first top web splicing apparatus 29, the corresponding feed path 48, 49 is selected.

When this job has been finished, the residual paper roll 27 which can be completely empty or can still be carrying paper is moved out of the corresponding unrolling unit away from the first top web path 43. The residual paper roll 27 is then moved back to the paper roll store 36 via the top web return path 47, the first top web path 43, the distribution path 40, the switch 41 and the feed/discharge path 39.

If the first intermediate web splicing apparatus 30 is to be re-equipped with the paper roll 27, the paper roll transport trolley 5 moves via the first switch 41 and the distribution path 40 into the intermediate web/top web path 44. The corresponding feed path 52, 53 is selected in a manner which is dependent on the required equipping of the third or fourth unrolling unit of the first intermediate web splicing apparatus 30.

When this job has been finished, the residual paper roll 27 which can be completely empty or can still be carrying paper is moved out of the corresponding unrolling unit away from the first intermediate web/top web path 44. The residual paper roll 27 is then moved back to the paper roll store 36 via the intermediate web/top web return path 51, the first intermediate web/top web path 44, the distribution path 40, the switch 41 and the feed/discharge path 39.

If the second top web splicing apparatus 32 is to be re-equipped with the paper roll 27, the paper roll transport trolley 5 moves via the first switch 41 and the distribution path 40 into the intermediate web/top web path 44. The corresponding feed path 54, 55 is selected in a manner which is dependent on the required equipping of the fifth or sixth unrolling unit of the second top web splicing apparatus 29.

When this job has been finished, the residual paper roll 27 which can be completely empty or can still be carrying paper is moved out of the corresponding unrolling unit away from the intermediate web/top web path 44. The residual paper roll 27 is then moved back to the paper roll store 36 via the intermediate web/top web return path 51, the intermediate web/top web path 44, the distribution path 40, the switch 41 and the feed/discharge path 39.

If the second intermediate web splicing apparatus 33 is to be re-equipped with the paper roll 27, the paper roll transport trolley 5 moves via the second switch 42 and the distribution path 40 into the intermediate web/laminating web path 45. The corresponding feed path 58, 59 is selected in a manner which is dependent on the required equipping of the seventh or eighth unrolling unit of the second intermediate web splicing apparatus 33.

When this job has been finished, the residual paper roll 27 which can be completely empty or can still be carrying paper is moved out of the corresponding unrolling unit away from the intermediate web/laminating web path 45. The residual paper roll 27 is then moved back to the paper roll store 36 via the intermediate web/laminating web return path 57, the intermediate web/laminating web path 45, the distribution path 40, the second switch 42 and the feed/discharge path 39.

If the laminating web splicing apparatus 34 is to be re-equipped with the paper roll 27, the paper roll transport trolley 5 moves via the second switch 42 and the distribution path 40 into the intermediate web/laminating web path 45. The corresponding feed path 60, 61 is selected in a manner which is dependent on the required equipping of the ninth or tenth unrolling unit of the laminating web splicing apparatus 34.

When this job has been finished, the residual paper roll 27 which can be completely empty or can still be carrying paper is moved out of the corresponding unrolling unit away from the intermediate web/laminating web path 45. The residual paper roll 27 is then moved back to the paper roll store 36 via the intermediate web/laminating web return path 57, the intermediate web/laminating web path 45, the distribution path 40, the second switch 42 and the feed/discharge path 39.

The paper roll transport trolleys 5 move safely on their movement path which is formed by way of the individual paths. In the process, they are charged in charging zones which are formed by way of coils 66 in the ground along the movement path. The coils 66 are preferably laid centrally with regard to the movement path marking, and extend over a majority of the movement path. The electric energy of the coils 66 is transmitted to the paper roll transport trolleys 5 via their energy transmission device 25. The charging zones favorably coincide with waiting zones.

A circuit is produced in the corrugated board plant by way of the paper roll transport trolleys 5, which circuit is formed, in particular, by way of the inward transport of the paper rolls 27 and the outward transport of the residual paper rolls 27. The inward transport of the paper rolls 27 and/or the outward transport of the residual paper rolls 27 take/takes place in each case at least partially, preferably at least mostly, in one-way road operation or in a unidirectional manner. The outward transport or return transport of the residual paper rolls 27 takes place at least partially, preferably at least mostly, on a separate path.

The feed/discharge path 39 is utilized both for feeding and for discharging of the paper roll transport trolleys 5 in relation to the paper roll store 36, regardless of the splicing apparatus 29, 32, 30, 33, 34, for which the paper roll transport trolleys 5 are provided or from which they are coming.

The distribution path 40 is also utilized at least partially by all the paper roll transport trolleys 5. The paper roll transport trolleys 5 utilize said distribution path 40 at least partially, in order to arrive at the planned splicing apparatus 29, 32, 30, 33, 34 and/or to return from it or to the feed/discharge path 39.

In the case of the corrugated board plant, in particular, a plurality (preferably all) of the paper rolls 27 which are to be moved for a job can be moved in parallel and/or at the same time by way of the paper roll transport trolleys 5, which is highly economical and leads to rapid paper roll changes. The movement path of the paper roll transport trolleys 5 is directional.

It is advantageous if, in accordance with one alternative embodiment, the paper roll transport trolleys 5 are set in motion only when a switch on the paper roll transport trolley 5 is supplied with energy via induction. Without energy from the coils 66, the paper roll transport trolley 5 brakes in a controlled manner to a standstill.

The safety device 22 of the paper roll transport trolleys 5 prevents collisions.

It is expedient if the respective position of the paper roll transport trolley 5 can be determined, for example by way of sensors. Precise positions of the respective paper roll transport trolley 5 can favorably be determined by way of encoding means along the movement path.

Each paper roll transport trolley 5 can also be controlled manually. To this end, each paper roll transport trolley 5 has an auxiliary control device 63 for connection to an external portable auxiliary controller 64.

As an alternative, a corrugated board production line for the formation of a three-layer or seven-layer corrugated board web is provided.

In the following text, a second embodiment of a corrugated board plant will be described with reference to FIG. 16. Identical parts and/or elements are given the same designations as in the case of the first embodiment, reference being made here by explicitly to the description of said first embodiment. Structurally different but functionally identical parts are given the same designations followed by an "a".

Figure 16:
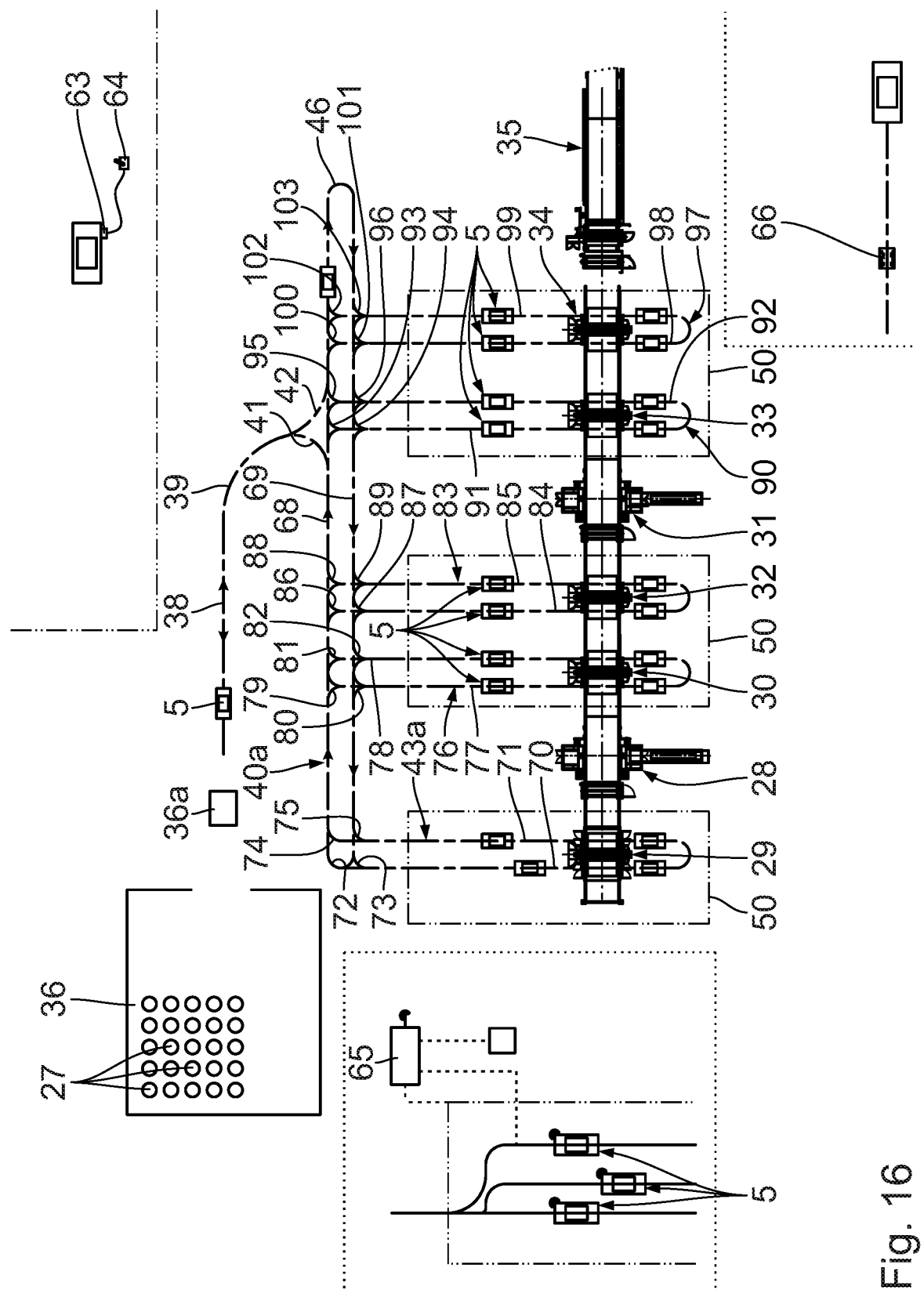
FIG. 16 shows a partial plan view of a simplified corrugated board plant according to the invention in accordance with a second embodiment, in which plant transport trolleys and the movement paths thereof are also shown.

In comparison with the first embodiment, the distribution path 40*a* in the case of the corrugated board plant according to FIG. 16 is configured as a one-way street and a circuit. The distribution path 40*a*, which is therefore endless, comprises a substantially straight first distribution path section 68 which adjoins the first switch 41 and second switch 42, and a second distribution path section 69 which runs parallel to the first distribution path section 68. The first and second distribution path section 68, 69 extend parallel to the straight section of the feed/discharge path 39 and the corrugated board production line, and are connected to one another.

The paper roll transport trolleys 5 are optionally moved in a first direction on the first distribution path section 68 during operation of the corrugated board plant, whereas the paper roll transport trolleys 5 are moved on the second distribution path section 69 in a second direction which is opposed to the first direction.

The distribution path 40*a* is adjoined by a first top web path 43*a*. The first distribution path section 68 and second distribution path section 69 are adjoined by the first top web path 43*a* which is as it were endless and comprises a first top web path section 70 and a second top web path section 71. The top web path sections 70, 71 extend parallel to one another and are aligned with the rolling units of the first top web splicing apparatus 29. The first top web path section 70 adjoins the first distribution path section 68 via a connector piece 72, and adjoins the second distribution path section 69 via a bend 73. The second top web path section 71 adjoins the first distribution path section 68 via a bend 74, and adjoins the second distribution path section 69 via a bend 75. The first and second top web path sections 70, 71 run through the corrugated board production line at the respective unrolling unit, and are connected to one another on the other side of the corrugated board production line.

The paper roll transport trolleys 5 can be moved both on the first top web path section 70 and on the second top web path section 71 in opposite directions for equipping the first top web splicing apparatus 29 and removing residual paper rolls 27. A circulating transport of the paper roll transport trolleys 5 in one direction for equipping the first top web splicing apparatus 29 and removing a residual paper roll 27 along the first top web path 43*a* is also possible.

The distribution path 40*a* is adjoined by a first intermediate web path 76. The first distribution path section 68 and second distribution path section 69 are adjoined by the first intermediate web path 76 which is as it were endless and comprises a first intermediate web path section 77 and a second intermediate web path section 78. The intermediate web path sections 77, 78 extend parallel to one another and to the top web path sections 70, 71. They are aligned with the unrolling units of the first intermediate web splicing apparatus 30. The first intermediate web path section 77 is connected to the first distribution path section 68 via a double bend 79, and is connected to the second distribution path section 69 via a double bend 80. The second intermediate web path section 78 is connected to the first distribution path section 68 via a double bend 81, and is connected to the second distribution path section 69 via a second double bend 82. The first and second intermediate web path sections 77, 78 run through the corrugated board production line at the respective unrolling unit, and are connected to one another on the other side of the corrugated board production line.

The paper roll transport trolleys 5 can be moved both on the first intermediate web path section 77 and on the second intermediate web path section 78 in opposite directions for equipping the first intermediate web splicing apparatus 30 and removing residual paper rolls 27. A circulating transport of the paper roll transport trolleys 5 in one direction for equipping the first intermediate web splicing apparatus 30 and removing a residual paper roll 27 along the first intermediate web path 76 is also possible.

The distribution path 40*a* is adjoined by a second top web path 83. The first distribution path section 68 and the second distribution path section 69 are adjoined by the second top web path 83 which is as it were endless and comprises a first top web path section 84 and a second top web path section 85. The top web path sections 84, 85 extend parallel to one another and to the top web path sections 70, 71. They are aligned with the unrolling units of the second top web splicing apparatus 32. The first top web path section 84 adjoins the first distribution path section 68 via a double bend 86, and adjoins the second distribution path section 69 via a double bend 87. The second top web path section 85 adjoins the first distribution path section 68 via a double bend 88, and adjoins the second distribution path section 69 via a double bend 89. The first and second top web path sections 84, 85 run through the corrugated board production line at the respective unrolling unit, and are connected to one another on the other side of the corrugated board production line.

The paper roll transport trolleys 5 can be moved both on the first top web path section 84 and on the second top web path section 85 in opposite directions for equipping the second top web splicing apparatus 32 and removing residual paper rolls 27. A circulating transport of the paper roll transport trolleys 5 in one direction for equipping the second top web splicing apparatus 32 and removing a residual paper roll 27 along the second top web path 83 is also possible.

The distribution path 40*a* is adjoined by a second intermediate web path 90. The first distribution path section 68 and second distribution path section 69 are adjoined by the second intermediate web path 90 which is as it were endless and comprises a first intermediate web path section 91 and a second intermediate web path section 92. The intermediate web path sections 91, 92 extend parallel to one another and to the top web path sections 70, 71. They are aligned with the unrolling units of the second intermediate web splicing apparatus 33. The first intermediate web path section 91 adjoins the first distribution path section 68 via a double bend 93, and adjoins the second distribution path section 69 via a double bend 94. The second intermediate web path section 92 adjoins the first distribution path section 68 via a double bend 95, and adjoins the second distribution path section 69 via a double bend 96. The first and second intermediate web path sections 91, 92 run through the corrugated board production line at the respective unrolling unit, and are connected to one another on the other side of the corrugated board production line.

The paper roll transport trolleys 5 can be moved both on the first intermediate web path section 91 and on the second intermediate web path section 92 in opposite directions for equipping the second intermediate web splicing apparatus 33 and removing residual paper rolls 27. A circulating transport of the paper roll transport trolleys 5 in one direction for equipping the second intermediate web splicing apparatus 33 and removing a residual paper roll 27 along the second intermediate web path 90 is also possible.

The distribution path 40*a* is adjoined by a laminating web path 97. The first distribution path section 68 and second distribution path section 69 are adjoined by the laminating web path 97 which is as it were endless and comprises a first laminating web path section 98 and a second laminating web path section 99. The laminating web path sections 98, 99 extend parallel to one another and to the top web path sections 70, 71. They are aligned with the unrolling units of the laminating web splicing apparatus 34. The first laminating web path section 98 adjoins the first distribution path section 68 via a double bend 100, and adjoins the second distribution path section 69 via a double bend 101. The second laminating web path section 99 adjoins the first distribution path section 68 via a double bend 102, and adjoins the second distribution path section 69 via a double bend 103. The first and second laminating web path sections 98, 99 run through the corrugated board production line at the respective unrolling unit, and are connected to one another on the other side of the corrugated board production line.

The paper roll transport trolleys 5 can be moved both on the first laminating web path section 98 and on the second laminating web path section 99 in opposite directions for equipping the laminating web splicing apparatus 34 and removing residual paper rolls 27. A circulating transport of the paper roll transport trolleys 5 in one direction for equipping the laminating web splicing apparatus 34 and removing a residual paper roll 27 along the laminating web path 97 is also possible.

The top web paths 43*a*, 83, intermediate web paths 76, 90 and the laminating web path 97 are connected to the distribution path 40*a* in a manner which is spaced apart from one another, and run in a manner which is spaced apart from one another. They are situated in a laser scanner protective region 50.

In the following text, the transport of the paper rolls 27 via the paper roll transport trolleys 5 in the corrugated board plant will be described in greater detail. In comparison with the preceding embodiment, each paper roll transport trolley 5 always moves during operation from the feed/discharge path 39 via the second switch 42 to the distribution path 40*a*. Each paper roll transport trolley 5 moves via the first distribution path section 68 to the second distribution path section 69. The central control unit 65 sends the loaded paper roll transport trolley 5 to the splicing apparatus 29, 30, 32, 33, 34 which requires the paper roll 27 via the corresponding path 70, 71, 77, 78, 84, 85, 91, 92, 98 and 99, respectively.

If the first top web splicing apparatus 29 is to be re-equipped with the paper roll 27, the paper roll transport trolley 5 moves via the bend 73 or the bend 75 from the second distribution path section 69 to the top web path section 70 or 71, respectively. The corresponding top web path section 70, 71 is selected in a manner which is dependent on the required equipping of the first or second unrolling unit of the first top web splicing apparatus 29.

Via the bend 72 or the bend 74, the paper roll transport trolley 5 can be returned with a residual paper roll 27 from the respective top web section 70, 71 to the first distribution path section 68, and can be moved from there back to the paper roll store 36 via the first switch 41 and the feed/discharge path 39. Here, the paper roll transport trolley 5 moves in an opposite direction in comparison with the equipping.

If the first intermediate web splicing apparatus 30 is to be re-equipped with the paper roll 27, the paper roll transport trolley 5 moves via the double bend 80 or the double bend 82 from the second distribution path section 69 to the intermediate web path section 77 or 78. The corresponding intermediate web path section 77, 78 is selected in a manner which is dependent on the required equipping of the first or second unrolling unit of the first intermediate web splicing apparatus 30. The paper roll transport trolley 5 can also pass via the double bend 79 or the double bend 81 from the first distribution path section 68 to the intermediate web path section 77 or 78.

Via the double bend 79 or the double bend 81, the paper roll transport trolley 5 can be returned with a residual paper roll 27 from the respective intermediate web path section 77, 78 to the first distribution path section 68. Via the double bend 80 or the double bend 82, the paper roll transport trolley 5 can be returned with a residual paper roll 27 to the second distribution path section 69. Here, the paper roll transport trolley 5 moves in an opposite direction in comparison with the equipping. It can be moved back to the paper roll store 36 via the first switch 41 and the feed/discharge path 39.

If the second top web splicing apparatus 32 is to be re-equipped with the paper roll 27, the paper roll transport trolley 5 moves via the double bend 87 or the double bend 89 from the second distribution path section 69 to the top web path section 84 or 85. The corresponding top web path section 84, 85 is selected in a manner which is dependent on the required equipping of the first or second unrolling unit of the second top web splicing apparatus 32. The paper roll transport trolley 5 can also pass via the double bend 86 or the double bend 88 from the first distribution path section 68 to the top web path section 84 or 85.

Via the double bend 86 or the double bend 88, the paper roll transport trolley 5 can return with a residual paper roll 27 from the respective top web path section 84, 85 to the first distribution path section 68. Via the double bend 87 or the double bend 89, the paper roll transport trolley 5 can return with a residual paper roll 27 to the second distribution path section 69. Here, the paper roll transport trolley 5 moves in an opposite direction in comparison with the equipping. It can move back to the paper roll store 36 via the first switch 41 and the feed/discharge path 39.

If the second intermediate web splicing apparatus 33 is to be re-equipped with the paper roll 27, the paper roll transport trolley 5 moves via the double bend 94 or the double bend 96 from the second distribution path section 69 to the intermediate web path section 91 or 92. The corresponding intermediate web path section 91, 92 is selected in a manner which is dependent on the required equipping of the first or second unrolling unit of the second intermediate web splicing apparatus 33. The paper roll transport trolley 5 can also pass via the double bend 93 or the double bend 95 from the first distribution path section 68 to the intermediate web path section 91 or 92.

Via the double bend 93 or the double bend 95, the paper roll transport trolley 5 can return with a residual paper roll 27 from the respective intermediate web path section 91, 92 to the first distribution path section 68. Via the double bend 94 or the double bend 96, the paper roll transport trolley 5 can return with a residual paper roll 27 to the second distribution path section 69. Here, the paper roll transport trolley 5 moves in an opposite direction in comparison with the equipping. It can move back to the paper roll store 36 via the first switch 41 and the feed/discharge path 39.

If the laminating web splicing apparatus 34 is to be re-equipped with the paper roll 27, the paper roll transport trolley 5 moves via the double bend 101 or the double bend 103 from the second distribution path section 69 to the laminating web path section 98 or 99. The corresponding laminating web path section 98, 99 is selected in a manner which is dependent on the required equipping of the first or second unrolling unit of the laminating web splicing apparatus 34. The paper roll transport trolley 5 can also pass via the double bend 100 or the double bend 102 from the first distribution path section 68 to the laminating web path section 77 or 78.

Via the double bend 100 or the double bend 101, the paper roll transport trolley 5 can return with a residual paper roll 27 from the respective laminating web path section 98, 99 to the first distribution path section 68. Via the double bend 101 or the double bend 103, the paper roll transport trolley 5 can return with a residual paper roll 27 to the second distribution path section 69. Here, the paper roll transport trolley 5 moves in an opposite direction in comparison with the equipping. It can move back to the paper roll store 36 via the first switch 41 and the feed/discharge path 39.

The invention claimed is:

1. A transport trolley for transporting material rolls, the transport trolley comprising:
   a frame;
   at least three running units for running on a ground, wherein the running units are connected to the frame;
   at least one movement drive for driving at least one of the running units, wherein the at least one movement drive is connected to the frame;
   a material roll receiving means for receiving a material roll to be transported, wherein the material roll receiving means is supported by the frame, the material roll receiving means being supported with respect to the frame by means of at least one spring unit, wherein the material roll receiving means has, at a bottom thereof, at least one supporting element for support with respect to the ground in case of compression of the at least one spring unit; and
   a communications device with a receiver unit for receiving external information items, the communications device being connected to the frame and being in signal connection with the at least one movement drive for actuating the latter.

2. The transport trolley as claimed in claim 1, wherein the material roll receiving means is at most at a spacing of 100 mm with respect to the ground at a lowest receiving point of the material roll receiving means in a transport position.

3. The transport trolley as claimed in claim 1, further comprising a guide for a guided vertical movement of the material roll receiving means with respect to the frame, wherein the guide acts between the material roll receiving means and the frame.

4. The transport trolley as claimed in claim 1, further comprising an energy storage unit for outputting electric energy to the at least one movement drive.

5. The transport trolley as claimed in claim 1, further comprising a material roll detection sensor for detecting a loading state of the transport trolley.

6. The transport trolley as claimed in claim 1, further comprising at least one safety device for preventing accidents.

7. The transport trolley as claimed in claim 1, further comprising at least one movement path detection device for controlling the transport trolley along a predefined movement path.

8. The transport trolley as claimed in claim 1, wherein the transport trolley is movable along an imaginary movement path which is defined in software.

9. The transport trolley as claimed in claim 1, wherein the receiver unit is capable of receiving at least one of moving information items and target information items.

10. The transport trolley as claimed in claim 1, further comprising at least one auxiliary control device for connecting to an external auxiliary controller for manual actuating the transport trolley.

11. The transport trolley as claimed in claim 1, further comprising at least one emergency shutdown device for rapidly setting the transport trolley into a safe state.

12. The transport trolley as claimed in claim 1, wherein the transport trolley is actuatable autonomously.

13. The transport trolley as claimed in claim 1, wherein the transport trolley is steerable.

14. The transport trolley as claimed in claim 1, wherein:
the at least three running units comprises six running units;
four of the running units are arranged in corner regions of the frame in a deflectable manner; and
two of the running units are arranged in a center region of the frame in a rotationally drivable manner.

15. The transport trolley as claimed in claim 1, wherein the transport trolley is configured to transport the material rolls in a corrugated board plant.

16. The transport trolley as claimed in claim 1, wherein the at least one spring unit being prestressed.

17. The transport trolley as claimed in claim 1, further comprising at least one safety device for preventing accidents, the at least one safety device being of a visual type.

18. The transport trolley as claimed in claim 1, wherein the transport trolley is steerable by way of corresponding actuation.

19. The transport trolley as claimed in claim 1, wherein:
the at least three running units comprises six running units;
four of the running units are arranged in corner regions of the frame in a deflectable manner; and
two of the running units are arranged in a center region of the frame in a rotationally drivable manner and each of the rotationally drivable running units is rotationally drivable by an own movement drive for moving and deflecting the transport trolley.

20. The transport trolley as claimed in claim 1, wherein the material receiving means is configured to receive the material roll such that the material roll projects in a material roll longitudinal direction on both sides with respect to the transport trolley.

21. A corrugated board plant with at least one transport trolley for transporting material rolls, the transport trolley comprising:
a frame;
at least three running units for running on a ground, wherein the running units are connected to the frame;
at least one movement drive for driving at least one of the running units, wherein the at least one movement drive is connected to the frame;
a material roll receiving means for receiving a material roll to be transported, wherein the material roll receiving means is supported by the frame, the material roll receiving means being supported with respect to the frame by means of at least one spring unit, wherein the material roll receiving means has, at a bottom thereof, at least one supporting element for support with respect to the ground in case of compression of the at least one spring unit; and
a communications device with a receiver unit for receiving external information items, the communications device being connected to the frame and being in signal connection with the at least one movement drive for actuating the latter.

22. The corrugated board plant as claimed in claim 21, wherein the at least one transport trolley is capable of navigating crossroads.

23. A transport trolley for transporting material rolls, the transport trolley comprising:
a frame;
three running units for running on a ground, wherein the running units are connected to the frame;
a movement drive for driving at least one of the running units, wherein the movement drive is connected to the frame;
a spring unit;
a material roll receiving means for receiving a material roll to be transported, wherein the material roll receiving means is supported by the frame, the material roll receiving means being supported with respect to the frame via at least the spring unit, wherein the material roll receiving means has a material roll receiving means bottom, the material roll receiving means bottom comprising at least one supporting element configured to support the material roll receiving means with respect to the ground in case of compression of the spring unit, the at least one supporting element being configured to move relative to the frame in case of compression of the spring unit; and
a communications device with a receiver unit for receiving external information items, the communications device being connected to the frame and being in signal connection with the at least one movement drive for actuating the latter.

24. The transport trolley as claimed in claim 23, wherein the spring unit is in contact with the frame.

25. The transport trolley as claimed in claim 23, further comprising:
another spring unit, the material roll receiving means being supported with respect to the frame via the another spring unit, the at least one supporting element being located between the spring unit and the another spring unit.

* * * * *